(No Model.)
P. M. BARRETT.
HOISTING AND CONVEYING APPARATUS.
No. 536,122. Patented Mar. 19, 1895.
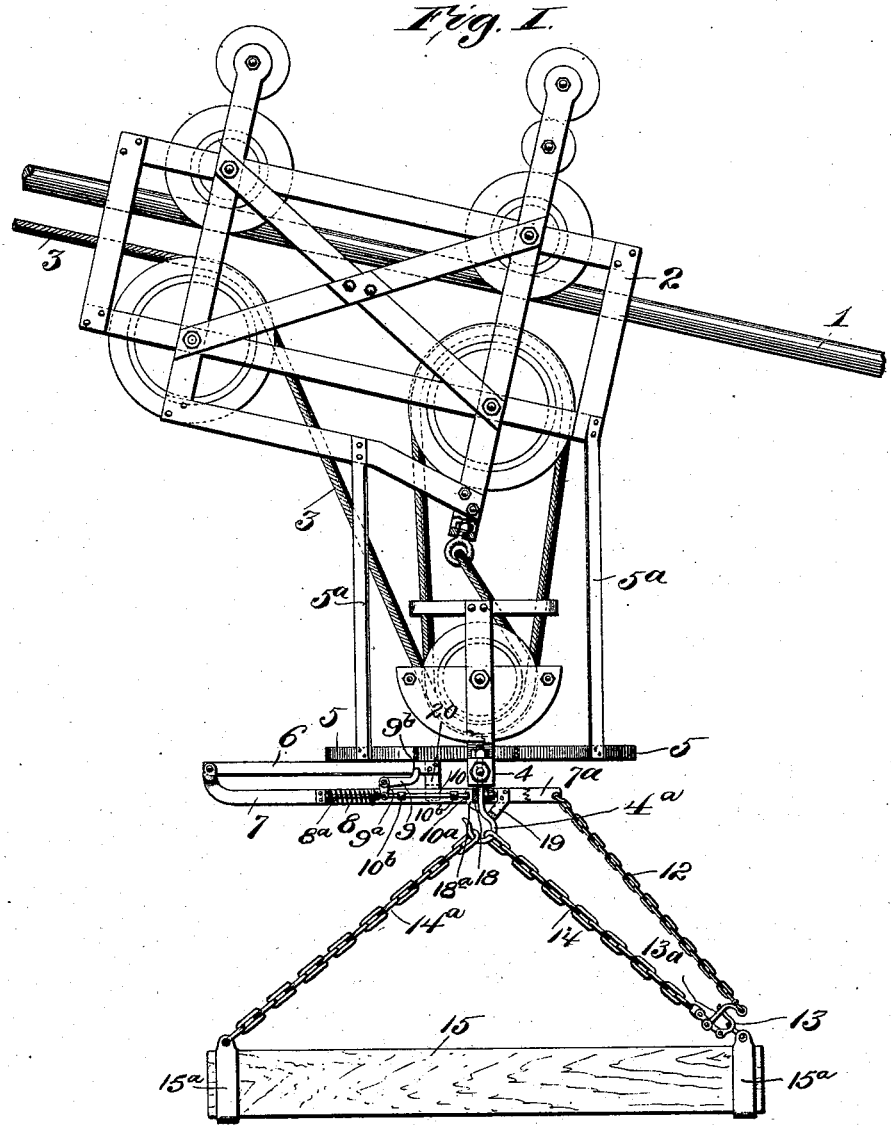
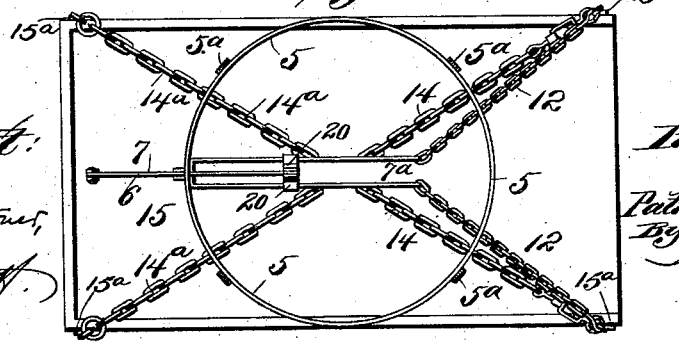

(No Model.) 2 Sheets—Sheet 2.
P. M. BARRETT.
HOISTING AND CONVEYING APPARATUS.
No. 536,122. Patented Mar. 19, 1895.
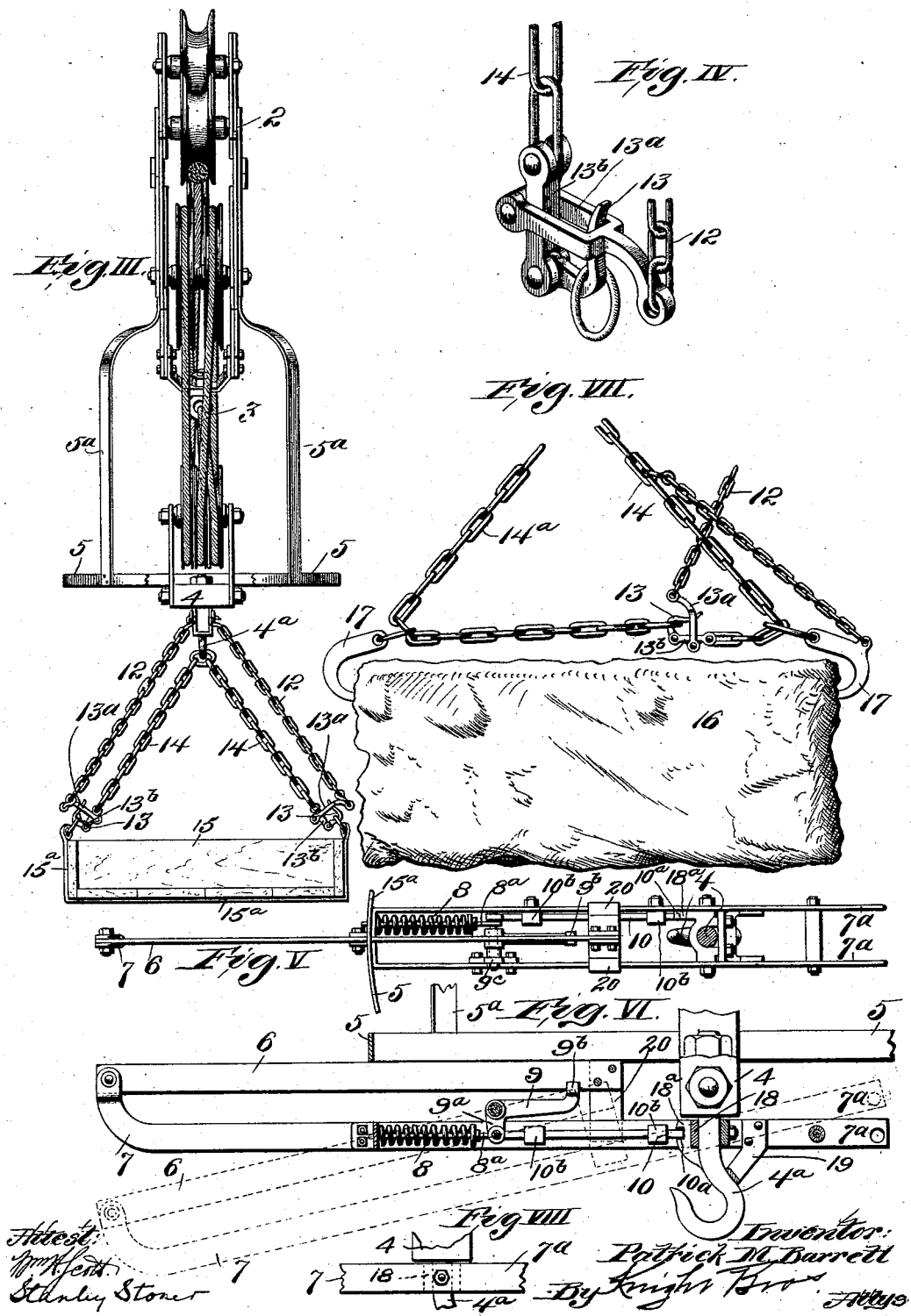

UNITED STATES PATENT OFFICE.

PATRICK M. BARRETT, OF ST. LOUIS, MISSOURI, ASSIGNOR OF ONE-THIRD TO MICHAEL CLEARY, OF SAME PLACE.

HOISTING AND CONVEYING APPARATUS.

SPECIFICATION forming part of Letters Patent No. 536,122, dated March 19, 1895.

Application filed December 10, 1894. Serial No. 531,308. (No model.)

*To all whom it may concern:*

Be it known that I, PATRICK M. BARRETT, a citizen of the United States, and a resident of the city of St. Louis, in the State of Missouri, have invented certain new and useful Improvements in Hoisting and Conveying Apparatus, of which the following is a specification.

My invention relates to an improved apparatus for hoisting and conveying dirt, rocks, &c.; and automatically dumping or depositing such material, thereby avoiding the necessity of controlling the apparatus by hand.

My improvements consist in features of construction hereinafter described and claimed.

In order that my invention may be fully understood, I will proceed to describe it with reference to the accompanying drawings, in which—

Figure I is a side elevation of my improved hoisting and conveying apparatus partly in section. Fig. II is a top view of a dirt-box, and its tackle, the tripper-frame, and the tripper-ring. Fig. III is a front elevation of the apparatus. Fig. IV is an enlarged detail perspective view of a trip-hook employed to release that which is carried by the apparatus. Fig. V is an enlarged detail top view of the tripper-mechanism; the supporting hook being shown in transverse section beneath its block, and the latter being omitted. Fig. VI is an enlarged detail side elevation of the tripper-mechanism, partly in section, the tilted position of the tripper-frame being shown in dotted lines. Fig. VII is a detail side elevation of the rock-tackle. Fig. VIII is an enlarged detail side view showing the manner of pivoting the extensions of the lower tripper-bar to the supporting hook.

1 represents a cable, on which the apparatus may be supported, and 2 is the traveler, or carriage, which may be of any suitable construction, through which the main fall or hoisting rope 3 travels. The main fall rope supports and runs through a tackle-block 4, which in turn carries the hook 4$^a$. 5 is a tripper-ring supported on the traveler by means of straps 5$^a$. The tackle-block is so constructed as to run up into the tripper-ring and carries with it a tripper-mechanism which is operated by its impact with one side of the tripper-ring and is provided with a frame having an upper bar 6, and a lower bar 7, which is provided with extensions or arms 7$^a$ and hinged at its outer end to the upper bar.

8 is a spring coiled around a sliding rod 8$^a$. This rod is supported at its outer end on the inner extension 7$^a$, and is connected at its inner end with the short-arm 9$^a$ of a guard or lever 9 having a forked upper end 9$^b$ which engages the upper bar for a purpose hereinafter described. The lever 9, is pivoted to a bracket 9$^c$ on the outer extension 7$^a$.

10 is a locking-bar sliding in straps or guide-brackets 10$^b$ secured to the inner extension 7$^a$, and also connected with the short arm of the lever. The spring 8 forces the rod and locking-bar inward and presses the end of the long arm of the guard upward.

Connected with and controlled by the extensions 7$^a$ are draw chains 12. The lower ends of these chains are coupled to trip-hooks 13 by means of keepers 13$^a$ hinged to the fixed members 13$^b$ of the hooks. Coupled to the fixed members are chains 14 of the tackle. These chains 14 and the other chains 14$^a$ of the tackle are connected with a dirt-box 15 by means of bails 15$^a$, as shown in Figs. I, II, and III, or directly with a rock 16 or other body by means of dogs or hooks 17, as shown in Fig. VII. The tripper-frame is secured to the block-hook 4$^a$ by means of a sleeve or clip 18 located between the extensions, 7$^a$, pivoted thereto, and surrounding the stem of the hook. The clip 18 has an arm 18$^a$ formed with a notch or recess 10$^a$, with which the locking bar engages to hold the tripper-frame from tilting downward in one direction until disengaged, while a bracket or brace 19 secured to the extensions, 7$^a$, bears on the heel of the hook to prevent the tripper-frame from downward movement, while premitting it to rise in the opposite direction. The lower bar and its extensions are held in place by pendent cheek-plates 20 secured to the inner end of the upper bar.

The operation of the apparatus is as follows:—When the object to be lifted is fastened to the block-hook 4 and the rope 3 is drawn tight, the partial winding of the rope will elevate the load to a sufficient height so as to enable it to be transferred to the unloading place when by the continued winding of the rope the tackle-block is raised until the upper bar 6 of the tripper-frame is brought into contact with and bears against one side of the tripper-ring 5, when the continued elevation of the tackle-block will cause the lower bar 7 to turn on and approach the upper bar, and thus lift the pivot of the guard or lever 9 and depress the forked end of the lever, shifting the short arm of the lever, with the locking-bar and sliding rod, to overcome the action of the spring, by contracting it, thus detaching the outer end of the locking-bar from the arm of the sleeve or clip, and permitting the tripper-frame to rock on its bearing in the extensions to the position shown in dotted lines in Fig. VI. The outer end of the tripper-frame being the heaviest end, it drops and raises the opposite end, which action draws upon the chains 12 connected therewith and pulls on the keepers or yokes 13$^a$ and releases the hooks 13, and thereby allows the outer end of the dirt-box to drop and dump its contents or detach the tackle from the rock or other object supported thereby.

Having thus described my invention, the following is what I claim as new therein and desire to secure by Letters Patent:

1. The combination of a tripper-ring, a main fall rope, having a hook, a tripper-frame pivoted to the hook, and comprising an upper bar and a lower bar having extensions and hinged to the upper bar, a bar for locking the tripper-frame from movement on the hook, and a pivoted guard connected with the locking bar and bearing against the upper bar, substantially as described.

2. The combination of a tripper-ring, a main fall rope, having a hook, a tripper-frame pivoted to the hook, and comprising an upper bar, and a lower bar having extensions and hinged to the upper bar, a bar for locking the tripper-frame from movement on the hook, a pivoted guard, connected with the locking-bar and bearing against the upper bar, and a tackle having a trip-hook and keeper, draw chain connecting the keeper with the lower bar; the tripper-frame and trip-hook being released by the movement of the lower bar toward the upper bar when the latter bears against one side of the tripper-ring, substantially as described.

3. The combination of a traveler, a tripper-ring supported by the traveler, a fall-hook on the traveler, an upper bar pivoted to the fall-hook, a lower bar having extensions and hinged to the upper bar, a spring operated bar on the lower bar, adapted to engage with the fall-hook and adapted to be disengaged by the movement of the lower-bar toward the upper bar, chains for supporting an object to be raised, a trip-hook and keeper, and a draw chain connecting the keeper with the extensions; substantially as described.

PATRICK M. BARRETT.

In presence of—
W. FINLEY,
STANLEY STONER.